United States Patent [19]

Dudynskyj et al.

[11] 4,124,096

[45] Nov. 7, 1978

[54] WHEELCHAIR LIFT DEVICE

[75] Inventors: Peter P. Dudynskyj, Metamora; Daniel L. Kline, Utica; James T. Hogan, Oxford, all of Mich.

[73] Assignee: General Motors Corporation, Detroit, Mich.

[21] Appl. No.: 839,320

[22] Filed: Oct. 4, 1977

[51] Int. Cl.$^2$ .......................... B60P 1/44; B60R 3/02
[52] U.S. Cl. ............................. 187/9 R; 214/75 R; 280/166
[58] Field of Search ........................ 187/1 R, 9 R, 10; 214/75 R, 75 H, 75 G, 75 T; 280/166; 296/62; 105/443, 447, 449

[56] References Cited

U.S. PATENT DOCUMENTS

| 461,156 | 10/1891 | Barber | 105/447 |
|---|---|---|---|
| 3,368,704 | 2/1968 | Pope | 214/75 R |
| 3,488,066 | 1/1970 | Hansen | 280/163 |
| 3,572,754 | 3/1971 | Fowler | 280/166 |
| 3,675,593 | 7/1972 | Tonne et al. | 280/166 |
| 3,913,497 | 10/1975 | Maroshick | 105/447 |
| 3,918,596 | 11/1975 | Ward | 214/75 R |
| 3,957,284 | 5/1976 | Wright | 280/166 |
| 4,027,807 | 6/1977 | Thorley | 214/75 R |
| 4,029,223 | 6/1977 | Adamski et al. | 214/77 R |
| 4,039,091 | 8/1977 | Adamski et al. | 214/77 R |

Primary Examiner—Evon C. Blunk
Assistant Examiner—Jeffrey V. Nase
Attorney, Agent, or Firm—Edward J. Biskup

[57] ABSTRACT

A wheelchair lift device including a platform located in the stepwell of a motorcoach for raising and lowering a wheelchair between a first position wherein the platform is in horizontal alignment with an elevated floor formed with the motorcoach and a second position wherein the platform is at ground level. The device includes foldable hinged sections that are positioned through a linkage to form steps for use by able-bodied persons and are extensible laterally outwardly relative to the stepwell so as to align the hinged sections along a horizontal plane and thereby form the platform for supporting the wheelchair.

3 Claims, 5 Drawing Figures

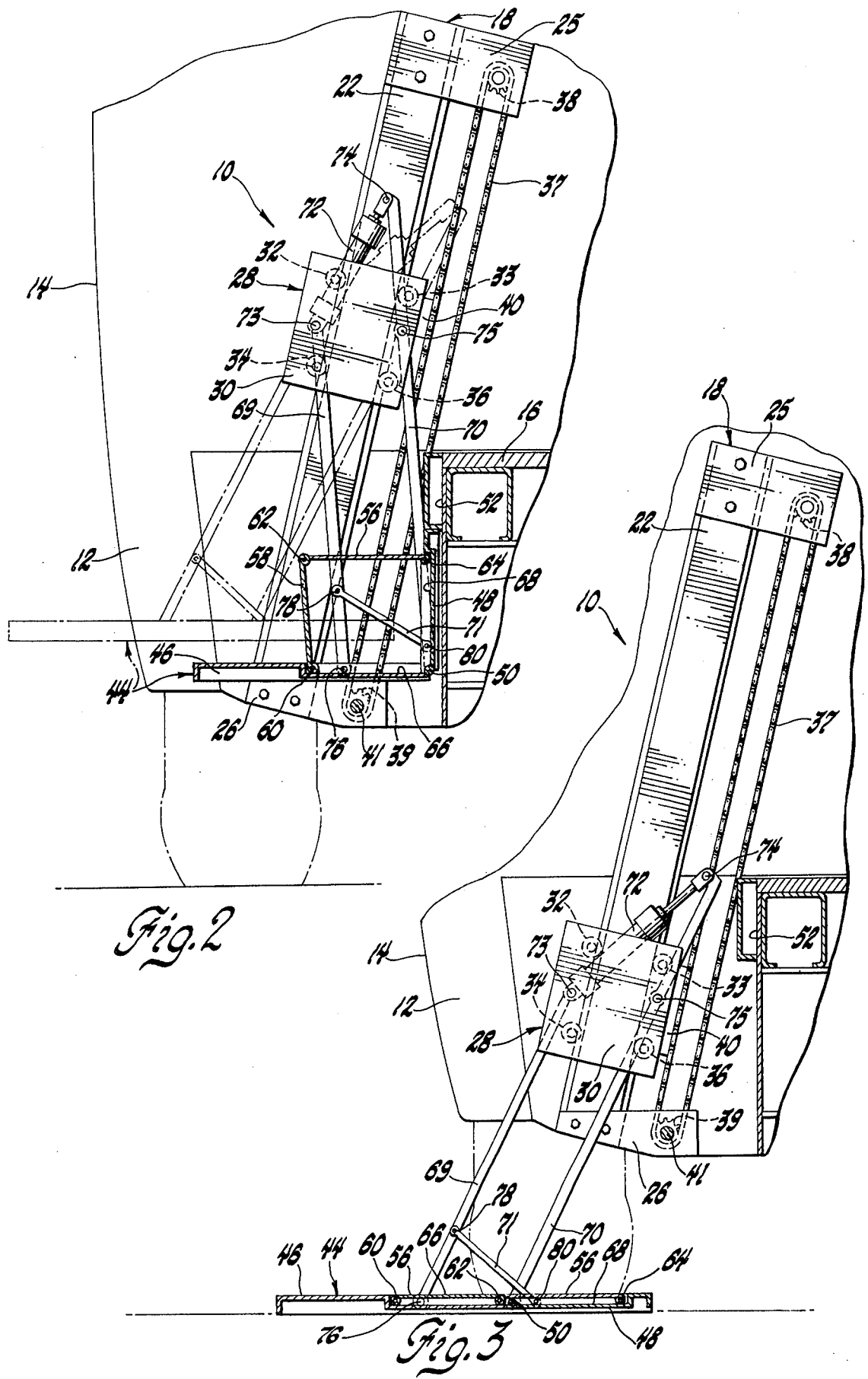

WHEELCHAIR LIFT DEVICE

This invention concerns elevator devices in general and more particularly a wheelchair lift device that can be used with a motor vehicle.

Vehicles used for mass transit such as motorcoaches and buses may be required by government regulations to be equipped with elevators or lift devices that would allow physically handicapped persons using wheelchairs to gain entry to and exit from the vehicle. One form of wheelchair lift device that had previously been proposed for this purpose can be seen in U.S. Pat. No. 3,912,048, issued on Oct. 14, 1975 in the name of Donald L. Manning, and assigned to the assignee of this invention. The device disclosed in the Manning patent includes a folding scissors type linkage that supports a step frame and maintains a step plate in a horizontal attitude while permitting movement thereof between a lowered position at ground level and a raised position at the floor level of the vehicle. A hydraulic cylinder acts between the step frame and the step plate to move the latter between a step forming position and an extended position wherein the step plate extends laterally outwardly beyond the confines of the bus body to provide a surface of sufficient length to accommodate a conventional wheelchair.

The wheelchair lift device according to this invention is similar to the device described above in that its intended function is to raise and lower a wheelchair between ground level and the floor of the motor vehicle. It differs from the Manning device, however, in that it does not employ the complicated scissors type linkage for this purpose, but instead utilizes a carriage-guide bar arrangement combined with a three-link mechanism that serves to convert a hinged assembly from a two-step stairway to a horizontal platform for the wheelchair. More specifically, the wheelchair lift device according to the invention includes a pair of substantially vertically oriented guide bars secured to the body of the vehicle on the opposite sides of the doorway that opens into a stepwell leading into the interior of the vehicle. A carriage is mounted on each of the guide bars for movement therealong to three positions. A parallelogram linkage including a pair of substantially vertically oriented links connects each of the carriages with a platform assembly which includes a plurality of hinged sections that normally form a stairway having treads and risers when the carriage is in one of the three positions. The linkage is combined with a power-operated linearly extensible motor, one end of which is pivotally connected to the carriage and the other end is pivotally connected to the upper end of one of the links. The arrangement of the links and the hinged sections is such that when the power-operated motor is extended, the hinged sections move laterally outwardly relative to the doorway under the control of the linkage and cause the platform assembly to be formed into a horizontal support. After the platform assembly is deployed, the carriage then is movable either to a raised position wherein it is in line with the vehicle floor or to a lowered position so as to place the wheelchair support at ground level.

The objects of the present invention are to provide a new and improved wheelchair lift device for a motor vehicle having a movable carriage which through a pair of generally vertically oriented link members supports a plurality of hinged sections that normally form a series of steps and by swinging the link members outwardly, the steps can be converted into a horizontal platform for supporting a wheelchair; to provide a new and improved wheelchair elevator that can be incorporated in the stepwell of a bus and that includes a plurality of hinged angularly related members which normally form a series of steps and are movable by a linearly extensible motor laterally outwardly relative to the stepwell under the control of a parallelogram linkage so as to cause the hinged members to be horizontally aligned and form a platform for supporting a wheelchair; to provide a new and improved wheelchair lift device for the stepwell of a bus that has a plurality of link members for supporting a plurality of hinged sections which through the expansion and contraction of a hydraulic cylinder are alternately formed into stairs for able-bodied persons and into a horizontal support platform for a physically handicapped person using a wheelchair; and to provide a new and improved wheelchair lift device that can be located in the stepwell opening of a bus and has foldable hinged sections that are positioned through a parallelogram linkage to form steps and are extensible laterally outwardly relative to the opening by the pivotal movement of the link members so as to align the hinged sections along a horizontal axis and thereby form a support platform for a wheelchair.

Other objects and advantages of the invention will be more apparent from the following detailed description when taken with the drawings in which:

FIG. 2 is an elevational view showing one of the vertical support assemblies of the wheelchair lift device of FIG. 1 with the platform thereof in the folded position and also being deployed in a horizontal plane;

FIG. 3 is a view of the wheelchair lift device similar to that shown in FIG. 2 with the platform being positioned at ground level;

Figure 1:
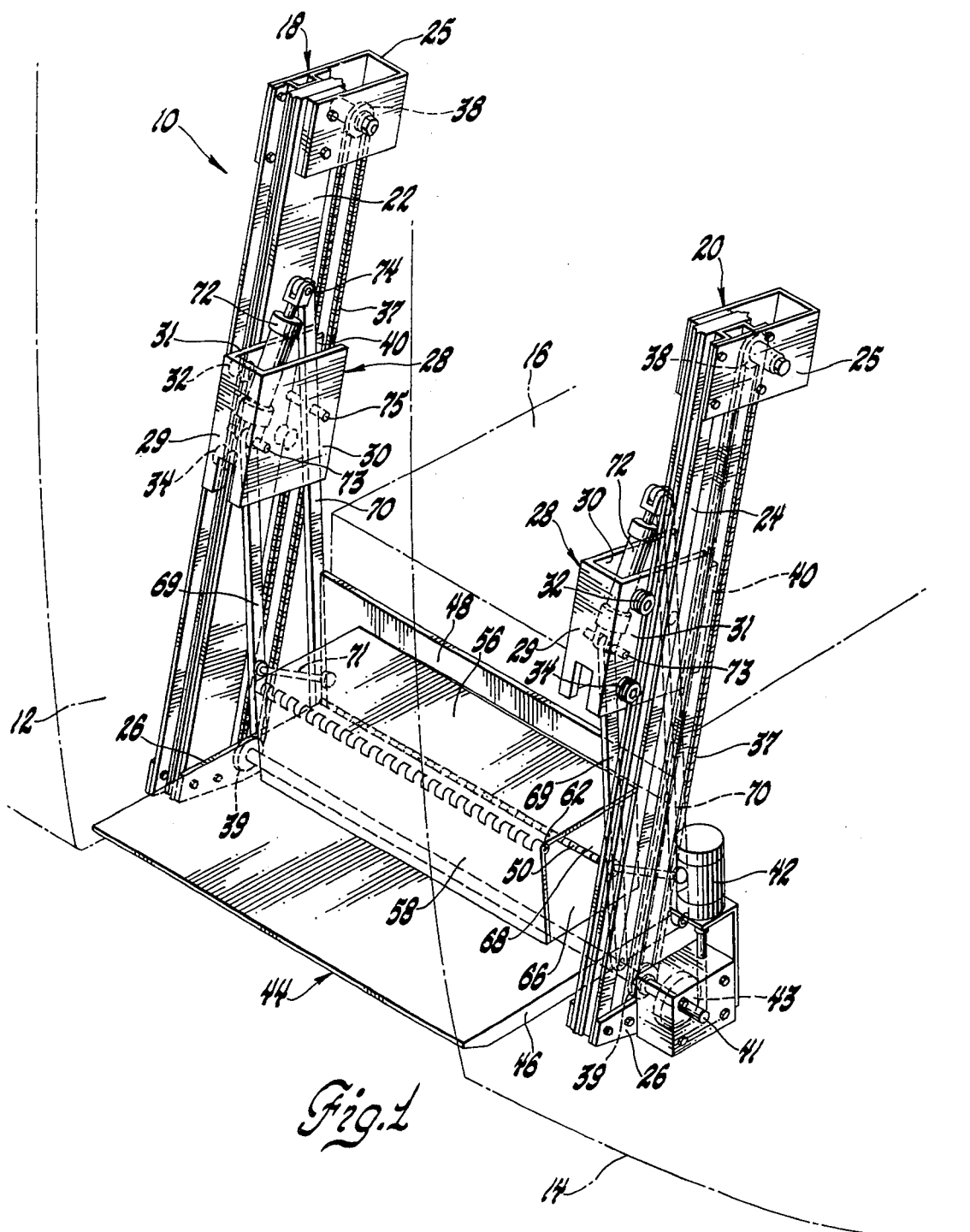
FIG. 1 is a perspective view showing a wheelchair lift device made in accordance with the invention and incorporated in the stepwell of a motorcoach.
Figure 5:
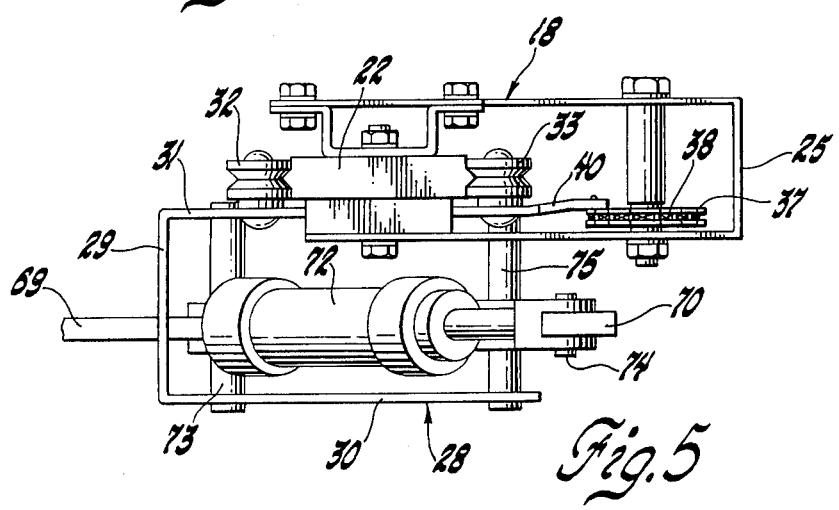
FIG. 5 is an enlarged sectional view taken on lines 5—5 of FIG. 4.

Referring to the drawings and more particularly FIGS. 1, 2 and 5 thereof, a wheelchair lift device 10 made in accordance with the invention is shown positioned within the stepwell 12 of a motor vehicle 14 such as a coach or bus of the type used in mass public transit having the usual floor 16 which is at an elevation substantially above ground level. As will be more apparent as the description of the invention proceeds, the wheelchair lift device 10 provides the usual two steps in the stepwell 12 of the vehicle permitting normal entry and exit for able-bodied passengers. In addition, and when it is desired, the steps of the wheelchair device 10 can be converted through a supporting linkage into a horizontal support for a wheelchair that can be moved between an aligned position with the vehicle floor 16 and a ground level position. In this manner, a physically handicapped person confined to a wheelchair can be served by the vehicle 14.

More specifically, the wheelchair lift device 10 comprises a pair of frame members 18 and 20 spaced along an axis parallel to the longitudinal axis of the vehicle 14 and located in the stepwell 12 and on the opposite sides thereof. The frame members 18 and 20 are secured in substantially vertical positions to the associated frame structure of the vehicle 14 and respectively include guide bars 22 and 24 each of which is secured at the upper and lower ends to "U" shaped brackets 25 and 26. As seen in FIG. 5, each of the guide bars 22 and 24 has the side edges thereof along their full length shaped in the form of a "V" when viewed in cross section. The side edges of each guide bar provide a track for supporting a carriage 28 that is movable along the guide bar. In this connection, it will be noted that each carriage 28 includes a housing comprising a front wall 29 integrally formed with a pair of parallel side walls 30 and 31. An upper pair of rollers 32 and 33 and a lower pair of rollers 34 and 36 are mounted on the side wall 31 of each carriage 28. The rollers engage the "V" shaped side edges of the associated guide bar and allow each carriage to move upwardly and downwardly between the positions shown in FIGS. 2, 3 and 4.

A chain drive, which includes an endless chain 37 and upper and lower rotatable sprockets 38 and 39 respectively carried by the brackets 25 and 26, is incorporated with each of the frame members 18 and 20 for moving the associated carriage between the aforementioned positions. As seen in FIG. 2, an extension 40 integrally formed with side wall 31 of the carriage is rigidly connected to a portion of the chain 37 so that upon rotational drive being directed to sprocket 39, the carriage is moved along the guide bar in an upward or downward direction. It will be noted that the lower sprocket 39 of the frame members 18 and 20 are drivingly interconnected by a common shaft 41 which, as seen in FIG. 1, extends between the frame members and is driven by a reversible hydraulic rotary motor 42 through reduction gearing 43. Thus, the carriages 28 are movable together from the normal position of FIGS. 1 and 2 to either the lowered position of FIG. 3 or the raised position of FIG. 4. During such movement, a platform 44 supported by the carriages 28 is moved as a unit between the latter mentioned positions.

It will be noted that the aforementioned steps form a part of the platform 44 which is located in the stepwell 12 and consists of a plurality of hinged sections that extend between the guide bars 22 and 24 as seen in FIG. 1. As best seen in FIGS. 1 and 2, the platform 44 includes a pair of planar base sections 46 and 48 which are pivotally interconnected at their inner ends by a pivotal connection 50 for movement about a horizontal axis that is substantially parallel to the longitudinal axis of the vehicle. The platform 44 is shown in the collapsed or folded position wherein it is disposed adjacent to a vertical back wall 52 formed rigidly with the body of the vehicle 14. In the collapsed position, the base section 48 is located in a vertical plane adjacent back wall 52 while the base section 46 is located in a horizontal plane. The base sections 46 and 48 support a planar tread member 56 and a planar riser member 58 that constitute additional hinged sections of the platform extending between the guide bars 22 and 24. The riser member 58 has one end connected by a pivotal connection 60 to the base section 46 intermediate the ends thereof. The other end of the riser member 58 is connected to one end of the tread member 56 by a piano hinge that provides a pivotal connection 62. The other end of the tread member 56 is connected to the base section 48 by a pivotal connection 64 adjacent the outer end of the base section 48. The base section 46, between pivotal connections 60 and 50, and the base section 48, between pivotal connections 50 and 64, are respectively formed with wells 66 and 68 having a depth and a longitudinal length for accommodating the thickness and longitudinal length of the associated tread and riser members 56 and 58 so as to allow storage of the latter when the platform 44 is deployed to the extended or unfolded position shown in phantom lines in FIG. 2 and in full lines in FIGS. 3 and 4.

Figure 4:
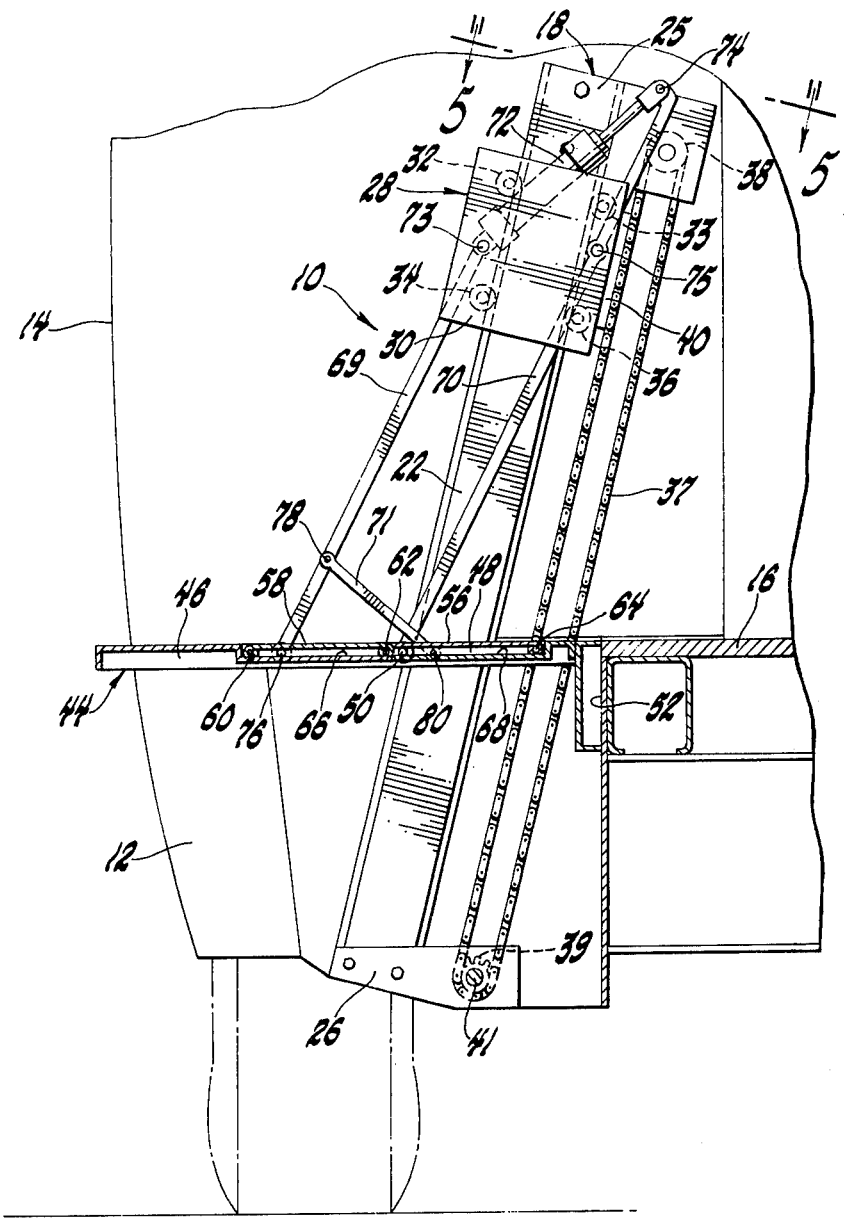
FIG. 4 is a view of the wheelchair lift device similar to that shown in FIGS. 2 and 3 but with the platform positioned in the plane of the floor of the motorcoach.

The deployment of the platform 44 to the unfolded positions of FIGS. 3 and 4 is realized through a support linkage incorporated with each of the carriages 28. The linkage includes parallel main support link members 69 and 70 and an interconnecting link member 71. As seen in FIGS. 1 and 2, the link members 69 and 70 are substantially vertically oriented when the platform 44 is in the folded position, and are combined with a double-acting hydraulic cylinder 72 that is selectively extensible and contractible through an appropriate hydraulic control system. The link members 69 and 70 together with the hydraulic cylinder 72 are carried by the carriage 28.

The hydraulic cylinder 72 consists of a cylinder member and a relatively reciprocating piston member with the base portion of the cylinder member being connected to the carriage 28 by a pivotal connection 73. The piston member of the hydraulic cylinder 72 is connected to the upper end of the link member 70 by a pivotal connection 74. The link member 70 has an intermediate portion thereof pivotally connected to the carriage 28 by a pivotal connection 75 while the lower end is pivotally connected to the inboard end of the base section 46 by the pivotal connection 50 which also connects the base section 46 to the base section 48. The link member 69 has its upper end pivotally connected to the carriage 28 at the pivotal connection 73 which as aforementioned connects the base end of the hydraulic cylinder 72 to the carriage. The lower end of the link member 69 is connected to the base section 46 intermediate the inboard and outboard ends thereof by a pivotal connection 76.

The link member 71 interconnects the link member 69 with the base section 48 and causes the latter to be aligned with the base section 46 when the platform 44 is deployed. In this regard, it will be noted that one end of the link member 71 is connected to the link member 69 by a pivotal connection 78 while the other end is connected to the base section 48 by a pivotal connection 80. Although not shown, the link member 71 is offset relative to the link members 69 and 70 so as to allow operation of the linkage in a manner to be described hereinafter without causing any interference between the three link members.

From the above description, it should be apparent that when the wheelchair lift device 10 has the parts thereof located in the normal position as seen in FIGS. 1 and 2, the tread and riser members 56 and 58 are disposed in substantially mutually perpendicular planes so as to form the riser and tread portions of one step while the outboard end of the base section 46 forms the tread portion of a second step. Thus, an able-bodied person can gain entrance into the vehicle 14 by first stepping on the outer end of the base section 46 and then on the tread member 56 and finally on the floor 16 of the vehicle. If, however, a physically handicapped person in a wheelchair should wish to enter the vehicle 14, the vehicle operator actuates a control valve of a suitable hydraulic control system (not shown) that directs pressurized fluid to the base ends of the hydraulic cylinders 72 while venting the piston rod ends of the cylinder members. This causes simultaneous extension of the hydraulic cylinders 72 with resultant clockwise pivoting of the link member 70 about the pivotal connection 75 as seen in FIG. 2. As the link member 70 rotates in this manner, it carries the base section 46 outwardly relative to the stepwell 12 under the control of the link member 69 which pivots in a clockwise direction about pivotal connection 73. This movement of the link members 69 and 70 continues until the base sections 46 and 48 are horizontally aligned as seen in phantom lines in FIG. 2. In this connection, as the link members 69 and 70 swing outwardly relative to the stepwell 12 from the full line position to the phantom line position, the distance between the link members 69 and 70, as measured along a line perpendicular to the link members 69 and 70, decreases so that the link member 71 causes the base section 48 to pivot clockwise relative to the base section 46 about pivotal connection 50 so as to move the two base sections into horizontal alignment as seen in phantom lines. At this point, the platform 44 is fully deployed to form a horizontal support surface for the wheelchair. It will be noted that as the platform 44 moves from the folded or collapsed position to the deployed position, the tread and riser members 56 and 58 move into the associated wells 66 and 68 formed in the base sections 46 and 48 so as to provide a substantially level, flat support surface.

After the platform 44 is in the phantom line position of FIG. 2, the operator, through the appropriate movement of the aforementioned control valve, causes the motor 42 to be actuated so as to rotate the drive sprockets 39 in a counterclockwise direction. As a result, the chains 37 incorporated with the frame members 18 and 20 are driven by the sprockets 39 and cause the carriages 28 to move downwardly along the guide bars 22 and 24 and at the same time, lower the platform 44 from the elevated phantom line position of FIG. 2 to the ground level position of FIG. 3. The wheelchair can then be rolled onto the platform 44 and locked into position. The vehicle operator then reverses the procedure, causing the drive sprockets 39 to be driven in a clockwise direction resulting in the carriages 28 and the platform 44 to be moved upwardly to the FIG. 4 raised position wherein the platform 44 is horizontally aligned with the floor 16. The wheelchair is then rolled onto the floor 16 after which the carriages 28 are returned to the intermediate position of FIGS. 1 and 2. Pressurized fluid is then directed to the piston rod end of the hydraulic cylinder 72 causing the support linkage to swing inwardly towards the floor 16 and return the various parts of the platform 44 to the folded position of FIG. 1 wherein the steps are formed for normal usage of the vehicle entrance.

Although not shown, it will be understood that the outer end of the base section 46 can be provided with a tapered ramp portion so as to facilitate rolling of the wheelchair onto the platform 44 when the latter is in the ground level position of FIG. 3. Also, in order to eliminate the possibility of an over-center action that could prevent the tread and riser members 56 and 58 from properly returning to the step forming position of FIG. 1 after they are located in the aligned position of FIG. 2, the tread and riser members 56 and 58 can be sized so that the center of the piano hinge or pivotal connection 62 is slightly above a horizontal plane passing through the centers of pivotal connections 60 and 64 when the platform 44 is in the FIG. 2 position. Another manner of accomplishing the same result would be to incorporate a spring at the pivotal connection 62 which would continuously bias the tread and riser members 56 and 58 towards the step forming position of FIG. 1. P Various changes and modifications can be made in this construction without departing from the spirit of the invention. Such changes and modifications are contemplated by the inventors and they do not wish to be limited except by the scope of the appended claims.

What is claimed is:

1. A lift device having a foldable platform located in the doorway of a motor vehicle for raising and lowering a load between a first position wherein the platform is in horizontal alignment with a floor formed with the motor vehicle and a second position wherein the platform is at ground level, said device comprising a pair of substantially vertically oriented guide bars secured to said vehicle at the opposite sides of said doorway, a carriage having vertically spaced roller means mounted thereon for rotation along each of said guide bars for controlling movement of said platform between said first and second positions, said platform comprising a pair of base sections, a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a horizontal axis, a second pivot connection joining said tread section and said riser section for pivotal movement about an axis parallel to said horizontal axis, third and fourth pivot connections joining said riser section and said tread sections to said base sections whereby said riser and tread sections are movable by said base sections between said step forming position and said load support position, a linkage comprising a pair of parallel links connecting the carriage with said base sections for supporting the platform, a power-operated linearly extensible and contractible member combined with said linkage and operatively connected to said carriage at one end and to one of said links at the other end for causing said linkage to swing outwardly relative to the doorway whereby the sections move into the load support position, and motor means including a chain drive operatively connected to the carriage for moving the platform between said first and second positions when the base sections are in said load support position.

2. A lift device having a foldable platform located in the doorway of a motor vehicle for raising and lowering a load between a first position wherein the platform is in horizontal alignment with a floor formed with the motor vehicle and a second position wherein the platform is at ground level, said device comprising a pair of substantially vertically oriented guide bars secured to said vehicle at the opposite sides of said doorway, a carriage having vertically spaced roller means mounted thereon for rotation along each of said guide bars for controlling movement of said platform between said first and second positions, said platform comprising a pair of planar base sections, a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a horizontal axis, a second pivot connection joining said tread section and said riser section for pivotal movement about an axis parallel to said horizontal axis, third and fourth pivot connections joining said riser section and said tread sections to said base sections whereby said riser and tread sections are movable by said base sections between said step forming position and said load support position, a linkage including a pair of parallel link members connecting the carriage with said base sections for supporting the platform, a double-acting hydraulic cylinder forming a part of said linkage and operatively connected to said carriage at one end and to one of said links at the other end for causing said linkage to swing outwardly relative to the doorway whereby the sections move into the load support position, and motor means including a chain drive operatively connected to the carriage for moving the platform between said first and second positions when the base sections are in said load support position.

3. A lift device having a foldable platform located in the doorway of a motor vehicle for raising and lowering a load between a first position wherein the platform is in horizontal alignment with an elevated floor formed with the motor vehicle and a second position wherein the platform is at ground level, said device comprising a pair of substantially vertically oriented guide bars secured to said vehicle at the opposite sides of said doorway, a carriage mounted on each of said guide bars for controlling movement of said platform between said first and second positions, said platform comprising a pair of planar base sections, a tread section and a riser section adapted to be moved from a step forming position wherein adjacent sections are angularly disposed relative to each other to a load support position wherein said adjacent sections are located in a horizontal plane, a first pivot connection joining said pair of base sections for pivotal movement about a horizontal axis, a second pivot connection joining said tread section and said riser section for pivotal movement about an axis parallel to said horizontal axis, third and fourth pivot connections joining said riser section and said tread sections to said base sections whereby said riser and tread sections are movable by said base sections between said step forming position and said load support position, a linkage including a pair of parallel link members pivotally connecting the carriage with one of said base sections for supporting the platform, an interconnecting link pivotally connected between one of said link members and the other of said base sections, a double-acting hydraulic cylinder having one end thereof operatively connected to said carriage and the other end thereof connected to the other of said link members for causing the lower portion of said linkage to swing outwardly relative to the doorway about its connections with the carriage, and the link members to move closer together whereby the sections move into the load support position, and motor means including a chain drive operatively connected to the carriage for moving the platform between said first and second positions when the base sections are in said load support position.

* * * * *